US012630727B2

(12) United States Patent
Nakashima et al.

(10) Patent No.: US 12,630,727 B2
(45) Date of Patent: \*May 19, 2026

(54) PHOTOCURABLE INKJET PRINTING INK COMPOSITION

(71) Applicant: SAKATA INX CORPORATION, Osaka (JP)

(72) Inventors: Okinori Nakashima, Osaka (JP); Koki Ogasahara, Osaka (JP); Kenji Kawamoto, Osaka (JP)

(73) Assignee: SAKATA INX CORPORATION, Osaka (JP)

( \* ) Notice: Subject to any disclaimer, the term of this patent is extended or adjusted under 35 U.S.C. 154(b) by 442 days.

This patent is subject to a terminal disclaimer.

(21) Appl. No.: 17/913,407

(22) PCT Filed: Feb. 18, 2021

(86) PCT No.: PCT/JP2021/006038
§ 371 (c)(1),
(2) Date: Sep. 21, 2022

(87) PCT Pub. No.: WO2021/199760
PCT Pub. Date: Oct. 7, 2021

(65) Prior Publication Data
US 2023/0167312 A1 Jun. 1, 2023

(30) Foreign Application Priority Data

Mar. 31, 2020 (JP) ................................ 2020-063782

(51) Int. Cl.
*C09D 11/101* (2014.01)
*B41J 2/01* (2006.01)
*C09D 11/36* (2014.01)

(52) U.S. Cl.
CPC ............ *C09D 11/101* (2013.01); *C09D 11/36* (2013.01); *B41J 2/01* (2013.01)

(58) Field of Classification Search
CPC ..... C09D 11/101; C09D 11/36; C09D 11/322; C09D 11/38; B41J 2/01
See application file for complete search history.

(56) References Cited

U.S. PATENT DOCUMENTS

| | | | |
|---|---|---|---|
| 4,639,472 A | 1/1987 | Green et al. | |
| 2015/0284579 A1* | 10/2015 | Mizutani | C09D 11/38 428/207 |
| 2016/0193852 A1 | 7/2016 | Guenther et al. | |
| 2018/0244933 A1* | 8/2018 | Tsuchiya | B41J 11/00214 |
| 2021/0380827 A1 | 12/2021 | Kamohara | |
| 2023/0279249 A1 | 9/2023 | Nakashima et al. | |
| 2023/0312953 A1 | 10/2023 | Nakashima et al. | |
| 2024/0018373 A1 | 1/2024 | Nakashima et al. | |

FOREIGN PATENT DOCUMENTS

| | | |
|---|---|---|
| EP | 4173825 A1 | 5/2023 |
| EP | 4194519 A1 | 6/2023 |
| EP | 4253484 A1 | 10/2023 |
| GB | 2561984 A | 10/2018 |
| JP | 2014015503 A | 1/2014 |
| JP | 2016529360 A | 9/2016 |
| JP | 2021042321 A | 3/2021 |
| JP | 2021042322 A | 3/2021 |
| WO | 2015022228 A1 | 2/2015 |
| WO | 2019077364 A1 | 4/2019 |
| WO | 2020179155 A1 | 9/2020 |
| WO | 2022128258 A1 | 6/2022 |

OTHER PUBLICATIONS

Nakajima et al., machine English translation of JP 2019-183018 (Year: 2019).\*
International Preliminary Report on Patentability, dated Sep. 29, 2022, for corresponding international application PCT/JP2021/006038 (1 page).
Notification Concerning Transmittal of International Preliminary Report on Patentability, mailed Oct. 13, 2022, for corresponding international application PCT/JP2021/006038 (1 page).
Notification of Transmittal of Translation of the International Preliminary Report on Patentability, mailed Oct. 13, 2022, for corresponding international application PCT/JP2021/006038 (1 page).
Written Opinion of the International Searching Authority, mailed May 18, 2021, for corresponding international application PCT/JP2021/006038 (4 pages).
Extended European Search Report (EESR) dated Mar. 19, 2024, issued for European counterpart patent application No. EP21781828.5 (6 pages).
International Search Report (ISR) mailed May 18, 2021, issued for International application No. PCT/JP2021/006038. (3 pages).

\* cited by examiner

*Primary Examiner* — Jessica M Roswell
(74) *Attorney, Agent, or Firm* — Law Office of Katsuhiro Arai

(57) ABSTRACT

An object is to provide a photocurable inkjet printing ink composition offering curability and adhesion on printing targets including sheets whose printing face is constituted by paper, polyester, polyvinyl chloride, ethylene-vinyl acetate-based copolymer, or other vinyl-based polymers, etc., and additionally having storage stability. The cured coating film has low odor, low tackiness, abrasion resistance, high water resistance, high ethanol resistance, stretchability, and excellent bending resistance. Means for solving the problem includes providing a photocurable inkjet printing ink composition containing vinyl methyl oxazolidinone by 5 to 50% by mass relative to the entire ink composition, a monofunctional photopolymerizable monomer having a glass-transition temperature of 10° C. or less by 10 to 50% by mass relative to the entire ink composition, a colorant, and a photopolymerization initiator.

3 Claims, No Drawings

PHOTOCURABLE INKJET PRINTING INK COMPOSITION

CROSS-REFERENCE TO RELATED APPLICATIONS

This application is the U.S. National Phase under 35 U.S.C. § 371 of International Application PCT/JP2021/006038, filed Feb. 18, 2021, which claims priority to Japanese Patent Application No. JP2020-063782, filed Mar. 31, 2020. The International Application was published under PCT Article 21(2) in a language other than English.

TECHNICAL FIELD

The present invention relates to a photocurable inkjet printing ink composition suitable for printing on, for example, sheets whose printing face is constituted by paper, a vinyl chloride-based polymer, or an ethylene-vinyl acetate-based copolymer, as well as a printed matter obtained by using the same.

BACKGROUND ART

Known photopolymerizable inkjet ink compositions include vinylcaprolactam, acryloyl morpholine, N,N-dimethylamide, or isobornyl acrylate.

Such an inkjet ink composition is increasingly used to print on, for example, sheets of paper or the above-mentioned resin sheets to obtain vivid, sophisticated design logos and patterns, as well as photographic images of exterior views of products or human faces. Additionally, in terms of billboard size, there are now quite a few large billboards that are intended to give a stronger impact on the viewers. Traditionally, general methods for manufacturing billboard ads included cutting out colored sheets in the shapes of letters and pasting them for those featuring logos, and utilizing various types of printing presses for those featuring photographic images. This made manufacturing of billboard ads time-consuming and labor-intensive, and the need for printing presses and other large-scale equipment also presented challenges.

Given the above, in order to easily manufacture vivid image billboards, attempts are made to utilize the inkjet method that can directly print a design made on a personal computer onto a base material.

The inkjet method is characterized in that it accommodates a wide range of materials that can be utilized as base materials for printing, allowing printing on sheets of paper, polymer, metal, and other hard/soft materials with ease. Particularly for billboard ads that are installed outdoors, the performance requirements include being lightweight, exceptionally strong and durable, rain-resistant, and inexpensive; therefore, the ability to easily print on polymer sheets having these properties is an extremely great advantage.

Additionally, in recent years, super-wide format inkjet printers have been introduced on the market that have a printing width of 2,000 mm or more, so as to allow, e.g., printing a large printed matter all at once that has been conventionally made by combining printed matters together by lamination, thereby making manufacturing of billboards easier and easier.

In general, tarpaulin is a frequent choice as a polymer sheet used for billboard ads. It should be noted that tarpaulin is a composite sheet comprising polyester or polyamide as a core material, with polyvinyl chloride, ethylene-vinyl acetate-based copolymers, or other vinyl-based polymers layered on top and bottom thereof.

As shown in Patent Literature 1, ultraviolet curable inkjet inks containing N-vinyloxazolidinone are known. In recent years, however, there is a high demand for low odor, high curing property, low tackiness, abrasion resistance, and high water resistance taking into consideration, for example, the ease of handling during printing.

The above-mentioned photocurable inkjet printing ink composition cannot meet these high demands.

BACKGROUND ART LITERATURE

Patent Literature

Patent Literature 1: Japanese National Phase Laid-Open Patent Publication No. 2016-529360

SUMMARY OF THE INVENTION

Problems to be Solved by the Invention

An object of the present invention is to provide a photocurable inkjet printing ink composition offering curability and adhesion to printing targets including sheets whose printing face is constituted by paper, polyester, polyvinyl chloride, ethylene-vinyl acetate-based copolymer, or other vinyl-based polymers, etc., and additionally having storage stability. The cured coating film has low odor, low tackiness, abrasion resistance, high water resistance, high ethanol resistance, stretchability, and excellent bending resistance.

Means for Solving the Problems

After studying in earnest to achieve the aforementioned object, the inventors of the present invention found that the aforementioned object could be achieved by a specific composition, and eventually completed the present invention.

To be specific, the present invention encompasses the following:

1. A photocurable inkjet printing ink composition comprising vinyl methyl oxazolidinone by 5 to 50% by mass relative to the entire ink composition, and
   a monofunctional photopolymerizable monomer having a glass-transition temperature of 10° C. or less, by 10 to 50% by mass relative to the entire ink composition, and further, a colorant, and
   a photopolymerization initiator.

2. The photocurable inkjet printing ink composition according to 1, comprising an amine-modified oligomer.

Effects of the Invention

A photocurable inkjet printing ink composition of the present invention is excellent in storage stability and exhibits the effect of being able to print on printing targets including sheets whose printing face is constituted by paper, polyester, polyvinyl chloride, ethylene-vinyl acetate-based copolymer, or other vinyl-based polymers, etc. while meeting the demands for low odor, high curing property, low tackiness, abrasion resistance, high water resistance, high ethanol resistance, high stretchability, and bending resistance.

MODE FOR CARRYING OUT THE INVENTION (Vinyl Methyl Oxazolidinone)

A photocurable inkjet printing ink composition of the present invention contains vinyl methyl oxazolidinone (5-methyl-3-vinyl oxazolidin-2-one) (hereinafter, sometimes referred to as "VMOX").

Vinyl methyl oxazolidinone itself is liquid with a relatively low viscosity at room temperature, and causes other components in the photocurable inkjet printing ink composition to be dissolved or dispersed. Furthermore, since vinyl methyl oxazolidinone has a lower viscosity than N-vinyl-caprolactam, even with a relatively large content of vinyl methyl oxazolidinone, the photocurable inkjet printing ink composition has an appropriate viscosity and is highly suitable for inkjet printing. Additionally, since it is excellent in terms of safety for the human body, it offers easy handling.

Furthermore, containing the vinyl methyl oxazolidinone makes the cured coating film to be low in odor and exhibit high curing property and high water resistance.

The content percentage of vinyl methyl oxazolidinone in the photocurable inkjet printing ink composition is preferably 5.0% by mass or more, more preferably 10.0% by mass or more, yet more preferably 20.0% by mass or more, or most preferably 25.0% by mass or more. Additionally, 50.0% by mass or less are preferred, 45.0% by mass or less are more preferred, 43.0% by mass or less are further preferred, and 38.0% by mass or less are most preferred.

A content less than 5.0% by mass may fail to sufficiently exhibit the effects achieved by containing vinyl methyl oxazolidinone, in particular, to prevent the cured coating film from having tackiness. A content exceeding 50.0% by mass deteriorates stretchability and bending resistance of the base material and the coating film as a whole after being cured. Thus, physical properties will be poor in printing on a printing base material having flexibility and extensibility.

It should be noted that with regard to tackiness and water resistance, replacing vinyl methyl oxazolidinone with N-vi-nylcaprolactam, etc., which has a glass-transition temperature comparable to that of vinyl methyl oxazolidinone, is insufficient. It is, therefore, important for the present invention to employ vinyl methyl oxazolidinone also in this aspect.

(Photopolymerizable Monomer)

The photopolymerizable monomer contained in the photocurable inkjet printing ink composition of the present invention is required to be odorless or have a low odor before being cured, and after being added to the photocurable inkjet printing ink composition, printed, and then cured.

Additionally, it is required to be sufficiently curable by the irradiation of energy rays such as ultraviolet ray and electron beams, to have no tackiness after being cured, and to have abrasion resistance, water resistance, stretchability, and bending resistance after being cured.

Among such photopolymerizable monomers, examples of a monofunctional photopolymerizable monomer include monofunctional (meth)acrylates such as benzyl (meth)acry-late, isooctyl (meth)acrylate, tridecyl (meth) acrylate, butyl (meth) acrylate, 2-ethylhexyl (meth)acrylate, lauryl (meth) acrylate, stearyl (meth)acrylate, 2-ethylhexyl carbitol (meth) acrylate, ethyl carbitol (meth)acrylate, 2-methoxyethyl (meth)acrylate, 2-methoxybutyl (meth)acrylate, 4-hydroxy-butyl (meth)acrylate, diethylene glycol monoethyl ether (meth) acrylate, ethoxy diethylene glycol (meth)acrylate, isoamyl (meth)acrylate, isodecyl (meth)acrylate, isooctyl (meth)acrylate, iso-tetradecyl (meth)acrylate, caprolactone (meth)acrylate, methoxy tripropylene glycol (meth)acrylate, EO (ethylene oxide)-modified succinic acid (meth)acrylate, and, in particular, benzyl (meth)acrylate is preferred.

Examples of other monofunctional photopolymerizable monomers include acrylonitrile, acrylamide, styrene, and (meth)acrylic acid.

The content of such a monofunctional photopolymerizable monomer is 20.0 to 70.0% by mass, preferably 25.0 to 60.0% by mass, or more preferably 35.0 to 50.0% by mass in the photopolymerizable compound.

Specifically, it is necessary to contain the monofunctional monomer having a glass-transition temperature of 10° C. or less so that the content is 10 to 50% by mass relative to the entire ink composition. In particular, 15% by mass or more are preferred, and 20% by mass or more are more preferred, and also, 40% by mass or less are preferred, and 30% by mass or less are more preferred.

Stretchability and bending properties of the cured coating film are improved by containing the monofunctional monomer as above. Specifically, the monofunctional monomer having a glass-transition temperature of −10° C. or less is preferably contained so as to be 10 to 40% by mass relative to the entire ink composition. In particular, 15% by mass or more are preferred, and 30% by mass or less are more preferred.

It should be noted that even if isobornyl acrylate is used, the coating film needs to be low in odor after being cured. For this reason, the content of isobornyl acrylate in the photocurable inkjet printing ink composition needs to be 10% by mass or less, or moreover, 5% by mass or less.

A polyfunctional photopolymerizable monomer may be a compound including multiple carbon-carbon unsaturated bonds per molecule, and, for example, the following compounds may be employed.

Examples of a compound include (poly)alkylene glycol di(meth)acrylate such as vinyloxyethoxy ethyl (meth)acry-late, ethylene glycol di(meth)acrylate, propylene glycol di(meth)acrylate, butanediol di(meth)acrylate, hexanediol di(meth)acrylate, dipropylene glycol di(meth)acrylate, tri-ethylene glycol di(meth)acrylate, and tripropylene glycol di(meth)acrylate, 1,9-nonanediol di(meth)acrylate, neopen-tyl glycol di(meth)acrylate, dimethylol-tricyclodecane di(meth)acrylate, hydroxy pivalic acid neopentyl glycol di(meth)acrylate, polytetramethylene glycol diacrylate, trimethylolpropane tri(meth)acrylate and ethylene oxide-modified product thereof, pentaerythritol tri(meth)acrylate, pentaerythritol tetra(meth)acrylate and ethylene oxide-modified product thereof, dipentaerythritol penta (meth) acrylate and ethylene oxide-modified product thereof, dipen-taerythritol hexa (meth)acrylate and ethylene oxide-modified product thereof, urethane (meth)acrylate, epoxy (meth)acrylate, polyester (meth)acrylate, pentaerythrito-lethoxy tetraacrylate, caprolactam-modified dipentaerythri-tol hexaacrylate, ethoxylated bisphenol A diacrylate, and alkoxylated tetrahydrofurfuryl acrylate.

The content of such a polyfunctional photopolymerizable compound is 0 to 40% by mass, preferably 10 to 30% by mass, or more preferably 10 to 25% by mass in the photo-polymerizable compound.

(Oligomer Including Amino Group and/or Amide Group)

An oligomer including an amino group and/or an amide group is an acrylated amine compound such as CN371, CN373, CN383, CN386 (manufactured by Sartomer), which are oligomers of an acrylated amine compound having two photopolymerizable functional groups and two amino groups per molecule.

The content percentage of the oligomer having an amino group and/or amide group in the photocurable inkjet printing ink composition may be determined as required. However, 0.5% by mass or more are preferred, 1.0% by mass or more are more preferred, and 1.5% by mass or more are yet more preferred, and also, 20.0% by mass or less are preferred, 10.0% by mass or less are more preferred, and 5.0% by mass or less are yet more preferred. A content less than 0.5% by mass may fail to sufficiently exhibit the effects achieved by adding the oligomer, and a content exceeding 20.0% by mass may possibly damage the balance of the properties of the photocurable inkjet printing ink composition.

The photocurable inkjet printing ink composition of the present invention may contain an acrylic-based resin. Such an acrylic-based resin may be a polymer constituted by any (meth)acrylate that can dissolve in organic solvents, a copolymer of such polymers, etc. Such (meth)acrylate may be, for example, alkyl (meth)acrylate such as ethyl, propyl, or butyl (meth)acrylate; hydroxyalkyl (meth)acrylate such as hydroxymethyl, hydroxyethyl, hydroxypropyl, hydroxybutyl, hydroxypentyl (meth)acrylate, etc.

Examples include BR-60 (Tg: 75° C.), BR-64 (Tg: 55° C.), BR-75 (Tg: 90° C.), BR-77 (Tg: 80° C.), BR-83 (Tg: 105° C.), BR-87 (Tg: 105° C.), BR-88 (Tg: 105° C.), BR-90 (Tg: 65° C.), BR-93 (Tg: 50° C.), BR-95 (Tg: 80° C.), BR-105 (Tg: 50° C.), BR-106 (Tg: 50° C.), BR-107 (Tg: 50° C.), BR-108 (Tg: 90° C.), BR-113 (Tg: 75° C.), BR-115 (Tg: 50° C.), and BR-116 (Tg: 50° C.) manufactured by Mitsubishi Chemical Corporation, for example.

Although an acrylic-based resin does not necessarily have to be contained, in the case in which an acrylic-based resin is contained, the content of the acrylic-based resin relative to the total amount of photocurable inkjet printing ink composition is preferably 1.0 to 15.0% by mass, more preferably 2.0 to 12.0% by mass, or yet more preferably 5.0 to 10.0% by mass.

If the total amount of acrylic-based resin used is under 1.0% by mass, the fixing property on the base material becomes insufficient; if the total amount used exceeds 15.0% by mass, on the other hand, the solids content increases excessively, and discharge stability drops as a result.

It should be noted that, to the extent that it does not reduce the performance of the light-curable inkjet printing ink composition of the present invention, any resins other than the aforementioned acrylic resins, such as vinyl chloride resins, vinyl chloride-vinyl acetate resins and ethylene-vinyl acetate resins, styrene-acrylic resins, styrene-maleic acid resins, rosin resins, rosin ester resins, petroleum resin, cumarone indene resins, terpene phenol resins, phenol resin, ketone resin, urethane resin, melamine resin, urea resin, epoxy resins, cellulose resins, xylene resin, alkyd resin, aliphatic hydrocarbon resin, butyral resin, maleic acid resin, fumaric acid resin, etc., may also be combined.

(Colorant)

The colorant contained in the photocurable inkjet printing ink composition is preferably selected from known organic color pigments and inorganic color pigments conventionally used for the photocurable inkjet printing ink composition.

Specific examples of organic color pigments include azo pigments, azomethine pigments, polyazo pigments, phthalocyanine pigments, quinacridone pigments, anthraquinone pigments, indigo pigments, thioindigo pigments, quinophthalone pigments, benzimidazolone pigments, isoindoline pigments, isoindolinone pigments, and other organic pigments, where specific examples as expressed by the color index include Pigment Black 7, Pigment Blue 15, 15:1, 15:3, 15:4, 15:6, 60, Pigment Green 7, 36, Pigment Red 9, 48, 49, 52, 53, 57, 97, 122, 149, 168, 177, 178, 179, 206, 207, 209, 242, 254, 255, Pigment Violet 19, 23, 29, 30, 37, 40, 50, Pigment Yellow 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185, Pigment Orange 36, 43, 51, 55, 59, 61, 71, 74, etc.

The content of organic color pigment in the ink composition of the present invention is preferably 1.0 to 10.0% by mass.

(Carbon Black)

Carbon black that has been conventionally used for inkjet printing may be used as an inorganic color pigment. Since the smaller the average primary particle size, the more likely abrasion resistance and gloss performance of the colored image are improved, the average primary particle size is preferably 15 to 40 nm, or more preferably 20 to 30 nm.

The average primary particle size of carbon black means the value obtained as described below. First, a dispersion liquid is prepared that is obtained by sufficiently diluting and dispersing carbon black in chloroform to such a concentration that, when an image of carbon black aggregates is taken by a transmission electron microscope (TEM), images of aggregates on the photo do not overlap each other. Next, after spreading it on a mesh with a collodion film and drying it, while maintaining this state, a photo is taken to obtain a TEM photo (magnified by thirty thousand times). The TEM photo is read by a scanner, and image signals are digitized and then input to a computer. The area of each aggregate is calculated by image analysis. Furthermore, based on the area of each aggregate and the number of aggregated primary particles, the average area of the primary particles is obtained. The diameter of a circle having the same area as the average area is arithmetically set as the average particle size of the primary particles. Finally, the arithmetic mean of the average particle size of the primary particles based on all of the aggregates, or a specific number of aggregates is obtained to be set as the average primary particle size.

In the case carbon black is contained in the present invention, the content of carbon black is 1 to 12% by mass, or preferably 2 to 6% by mass relative to the entire photocurable inkjet printing ink composition. A content less than 1% by mass may decrease the intensity of the obtained image, and a content exceeding 6% by mass may undesirably decrease discharge stability of the inkjet ink composition.

Also, carbon black to be used preferably has a specific surface area of 80 to 150 m$^2$/g, or more preferably 100 to 130 m$^2$/g. This range is particularly preferred in terms of, for example, abrasion resistance, solid filling property, and anti-mottling property of the colored image. Also, carbon black to be used is preferably acidic carbon black, and more preferably has a pH of 2.5 to 4.

The specific surface area of the above-mentioned carbon black refers to the nitrogen adsorption specific surface area measured in accordance with Japanese Industrial Standards (JIS) K6217, and the pH refers to the pH value measured in accordance with JIS K6221.

Such carbon black includes, for example, Mitsubishi carbon black MA7, MA77, MA8, MA11, MA100, MA220, and the like.

(Other Inorganic Color Pigments)

Examples of other inorganic color pigments include titanium oxide, zinc flower, zinc oxide, lithopone, iron oxide, silicon dioxide, kaolinite, montmorillonite, talc, barium sulfate, calcium carbonate, silica, cadmium red, red iron oxide, molybdenum red, chrome vermillion, molybdate orange, lead yellow, chrome yellow, cadmium yellow, yellow iron oxide, titanium yellow, chromium oxide, viridian, cobalt green, titanium cobalt green, cobalt chrome green, ultramarine, ultramarine blue, Prussian blue, cobalt blue, cerulean blue, manganese violet, cobalt violet, mica, etc.

To the extent that it does not hinder the effects achieved by the present invention, any one type of these pigments may be used alone, or two or more types may be combined where the amount used is 0.5 to 10.0% by mass, or more preferably 2.0 to 7.0% by mass, relative to the total amount of photocurable inkjet printing ink composition. If the amount of pigment used is less than 0.5% by mass, coloring strength tends to be insufficient, while an amount exceeding 10.0% by mass tends to cause viscosity to rise and ink fluidity to drop.

(Pigment Dispersant)

In the case a pigment is contained in the photocurable inkjet printing ink composition of the present invention, the pigment dispersant that can be contained includes, for example, any ionic or nonionic surfactant or anionic, cationic, or nonionic high-molecular compound.

In particular, those constituted by high-molecular compounds are preferred and, for example, the carbodiimide-based compounds described in Japanese Patent Laid-open No. 2004-083872, International Patent Laid-open No. WO2003/076527, and International Patent Laid-open No. WO2004/000950, AJISPER PB821 and 822 that are basic functional group-containing copolymers (manufactured by Ajinomoto Fine-Techno Co., Inc.) (acid value and amine value are both 10 to 20 mgKOH/g), SOLSPERSE 56000 (manufactured by Lubrizol Corporation), SOLSPERSE 39000 (manufactured by Lubrizol Corporation), DISPERBYK (manufactured by BYK-Chemie Japan), etc., are preferred. Any one type of these pigment dispersants may be used alone, or two or more types may be combined.

In particular, basic functional group-containing copolymers with an amine value of 10 to 40 mgKOH/g are preferred.

It should be noted that any of the aforementioned pigment dispersants may be selected and used as deemed appropriate according to the type of pigment and type of organic solvent used.

(Organic Solvent)

The photocurable inkjet printing ink composition of the present invention may be, what is called solvent-free, where all the liquid components are solidified by curing reaction, or may be solvent-based where the printed coating film is dried to remove the solvent, and then cured. Note that water is not used as the solvent.

Organic solvent that can be contained in the photocurable inkjet printing ink composition of the present invention includes, for example, propylene carbonate, diethylene glycol dialkyl ether, dipropylene glycol alkyl ether acetate, and the like.

Furthermore, diethylene glycol dialkyl ether is preferably used so that its content relative to that of propylene carbonate, or "diethylene glycol dialkyl ether/propylene carbonate," is in the range of 1.0 to 15.0, or more preferably in the range of 2.0 to 13.0, or yet more preferably in the range of 4.0 to 10.0, or most preferably in the range of 5.0 to 8.0.

By using diethylene glycol dialkyl ether and propylene carbonate in these ranges, excellent wettability, fixing property, and solid filling property are achieved, along with excellent discharge stability, even in high-speed printing.

Also, diethylene glycol dialkyl ether is preferably used by 40.0 to 80.0% by mass in the photocurable inkjet printing ink composition, while propylene carbonate may be used preferably by 1.0 to 20.0% by mass, or from the viewpoint of further improving the printed image quality, more preferably by 3.0 to 18.0% by mass, or most preferably by 5.0 to 15.0% by mass in the photocurable inkjet printing ink composition.

Additionally, dipropylene glycol alkyl ether acetate needs to be contained in the photocurable inkjet printing ink composition, and its content is 5.0 to 20.0% by mass, preferably 8.0 to 15.0% by mass, more preferably 8.0 to 13.0%, or yet more preferably 9.0 to 12.0% by mass.

For the diethylene glycol dialkyl ether, diethylene glycol ethyl methyl ether and/or diethylene glycol diethyl ether is preferably used, or any other diethylene glycol dialkyl ether may also be combined.

The dipropylene glycol alkyl ether acetate may be preferably an alkyl group with 6 or fewer carbon atoms, or more preferably an alkyl group with 3 or fewer carbon atoms, or yet more preferably an alkyl group with 2 or fewer carbon atoms.

Also, besides diethylene glycol dialkyl ether, an alkylene glycol derivative with a flash point of 50 to 150° C. may also be combined in order to adjust the drying property and further improve anti-mottling property.

Examples of such alkylene glycol derivatives with a flash point of 50 to 150° C. include, for example, triethylene glycol dimethyl ether, triethylene glycol diethyl ether, tetraethylene glycol dimethyl ether, and other (poly)ethylene glycol dialkyl ethers, propylene glycol dimethyl ether, propylene glycol diethyl ether, dipropylene glycol dimethyl ether, dipropylene glycol diethyl ether, tetrapropylene glycol diethyl ether, tetrapropylene glycol dimethyl ether, and other (poly)propylene glycol dialkyl ethers, propylene glycol monobutyl ether, dipropylene glycol monomethyl ether, dipropylene glycol monoethyl ether, and other (poly)propylene glycol monoalkyl ethers, propylene glycol monoethyl ether acetate, propylene glycol monobutyl ether acetate, dipropylene glycol monomethyl ether acetate, dipropylene glycol monoethyl ether acetate, dipropylene glycol monobutyl ether acetate, and other (poly)propylene glycol monoalkyl ether monoalkyl esters, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monobutyl ether, and other (poly)ethylene glycol monoalkyl ethers, ethylene glycol monomethyl ether acetate, ethylene glycol monoethyl ether acetate, ethylene glycol monobutyl ether acetate, diethylene glycol monomethyl ether acetate, triethylene glycol monomethyl ether acetate, and other (poly)ethylene glycol monoalkyl ether monoalkyl esters, ethylene glycol diacetate, diethylene glycol diacetate, triethylene glycol diacetate, and other (poly)ethylene glycol diesters, ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, diethylene glycol monopropyl ether acetate, triethylene glycol monomethyl ether, triethylene glycol monoethyl ether acetate, triethylene glycol monobutyl ether acetate, and other (poly)ethylene glycol monoether monoesters.

Among the alkylene glycol derivatives with a flash point of 50 to 150° C., first, diethylene glycol ethyl methyl ether and diethylene glycol diethyl ether are called to attention.

The content of the alkylene glycol derivative with a flash point of 50 to 150° C. in the photocurable inkjet printing ink composition is preferably 45.0 to 78.0% by mass, or most preferably 50.0 to 75.0% by mass.

Also, to the extent that it does not significantly change the flash point of the entire solvent, ethylene glycol diethyl ether, ethylene glycol dimethyl ether, propylene glycol monomethyl ether, propylene glycol monoethyl ether, propylene glycol monomethyl ether acetate, etc., whose flash point is not in the range of 50 to 150° C. may also be combined.

In addition, preferably the total amount of organic solvent accounts for 80.0 to 98.0% by mass in the total ink composition. If the aforementioned total amount exceeds 98.0% by mass, printability of the obtained ink drops; if the total amount is under 80.0% by mass, on the other hand, a rise in ink viscosity is induced and discharge property of the ink from the nozzle tends to drop, which is not desired. The organic solvent preferably is odorless or has a low odor.

The ink composition may, but does not necessarily have to, contain an organic solvent having a boiling point of 180° C. or more. Furthermore, water is preferably not contained as a solvent.

(Photopolymerization Initiator)

For the photopolymerization initiator, 2,4,6-trimethylbenzoyl-diphenyl-phosphine oxide (product name: TPO, manufactured by Lambson Group Ltd.), 2,4,6-trimethylbenzoyl phenyl phosphinate ethyl (product name: TPOL, manufactured by Lambson Group Ltd.), or (2,4,6-trimethylbenzoyl)-phenyl phosphine oxide (product name: IRGACURE819, manufactured by BASF Corporation) may be used.

The content of the photopolymerization initiator is preferably in the range of 3 to 25% by mass, or more preferably in the range of 5 to 15% by mass relative to the total mass of the photopolymerizable components.

It is important to keep this range in terms of maintaining a balance between discharge property, curability, and storage stability.

(Sensitizer)

The photocurable inkjet printing ink composition of the present invention may further combine and use a photosensitizer (compound) with a polymerization initiator in order to promote curability under ultraviolet ray from a light-emitting diode (LED) light source. The photosensitizer has light-absorbing properties over a range of ultraviolet ray wavelengths of primarily 400 nm or higher, and expresses sensitization function to cause curing reaction when exposed to light of wavelengths in this range.

The sensitizer is an anthracene-based sensitizer, thioxanthone-based sensitizer, etc., but preferably a thioxanthone-based sensitizer. Any one of these may be used alone or two or more types may be combined.

Specific examples include 9,10-dibuthoxy anthracene, 9,10-diethoxy anthracene, 9,10-dipropoxy anthracene, 9,10-bis(2-ethyl hexyl oxy) anthracene, and other anthracene-based sensitizers, as well as 2,4-diethyl thioxanthone, 2-isopropyl thioxanthone, 4-isopropyl thioxanthone, and other thioxanthone-based sensitizers. Representative examples of commercial products include, for example, DBA and DEA (manufactured by Kawasaki Kasei Chemicals) for anthracene-based sensitizers, and DETX and ITX (manufactured by Lambson Group Ltd.) for thioxanthone-based sensitizers.

The content of the sensitizer is preferably in the range of 0 to 8.0% by mass relative to the total mass of the photopolymerizable components. Adding the sensitizer by more than 8.0% by mass is excessive and does not improve the effects, which is not desirable.

It should be noted that, if a thioxanthone-based sensitizer is used as the sensitizer, the photocurable inkjet printing ink composition tends to cause yellow discoloration and may assume a more yellowish hue than color based on the pigment (inherent hue); therefore, preferably the content of the thioxanthone-based sensitizer is determined for each color as deemed appropriate.

Specifically, in the case of a white ink composition or clear ink composition affected more by a change in color, preferably its sensitizer does not contain any thioxanthone compound. Additionally, in the case of a magenta ink composition or cyan ink composition, since the hue changes become a problem, preferably a sensitizer is used to the extent that it does not cause a problem with the hue. In the case of a black ink composition and yellow ink composition, since the hue is not affected even when discoloration occurs, and the photopolymerizability is lower than compositions of other hues, preferably a thioxanthone-based compound is used together as a sensitizer.

(Other Components)

Furthermore, in the photocurable inkjet printing ink composition of the present invention, various types of additives such as surfactant, plasticizer, polymerization inhibitor, surface conditioner, ultraviolet protective agent, photostabilizer, antioxidant, etc., may be used as necessary.

(Viscosity of Photocurable Inkjet Printing Ink Composition)

The photocurable inkjet printing ink composition of the present invention preferably has a viscosity of 30 mPa·s or less, more preferably 20 mPa·s or less, or yet more preferably 10 mPa·s or less at 25° C. Exceeding 30 mPa·s may possibly hinder jetting of the ink composition from inkjet printing nozzles.

Note that viscosity is measured using an E-type viscometer (product name: RE100L-type viscometer, Toki Sangyo Co., Ltd.) under conditions of 25° C. and 20 rpm.

(Production of Photocurable Inkjet Printing Ink Composition)

Next, a method for producing the photocurable inkjet printing ink composition of the present invention using these materials will be described.

The photocurable inkjet printing ink composition of the present invention can be obtained by, for example, dispersing and mixing the materials using a wet circulation mill, bead mill, ball mill, sand mill, attritor, roll mill, DCP mill, agitator, Henschel mixer, colloid mill, ultrasonic homogenizer, high-pressure homogenizer (Microfluidizer, Nanomizer, Ultimizer, Genus Py, DeBEE 2000, etc.), pearl mill, or other dispersion machines, and adjusting the viscosity of the photocurable inkjet printing ink composition to be in the range of 2 to 10 mPa·s.

Preferably the content of all organic solvents in the photocurable inkjet printing ink composition of the present invention, which is the total amount of ink composition less the total sum of the amounts of solid contents and other additives that may be used as necessary, is changed as deemed appropriate so as to bring the ink viscosity into the aforementioned range.

The thus obtained photocurable inkjet printing ink composition of the present invention can be used with inkjet printers on base materials whose top face layer at least is constituted by a paper or a resin such as a vinyl chloride-based polymer or ethylene-vinyl acetate-based copolymer.

(Use)

The photocurable inkjet printing ink composition of the present invention may be used for known purposes including paper base materials, but is particularly suitable for use on the top face layer of a base material that requires abrasion resistance and is constituted by a non-absorbent material. Non-absorbent materials may be any material including metals, resins, ceramics, etc., but preferably the ink composition is used on top face layers of resin base materials, or more strictly on top face layers where this resin is constituted by a vinyl chloride-based polymer or ethylene-vinyl acetate-based copolymer, vinyl chloride resin, polyethylene terephthalate, polycarbonate, etc., from the viewpoint of water resistance, and other properties. Also, preferably the ink composition is used on top face layers where this resin is constituted by polyethylene terephthalate (PET), vinyl chloride resin, polycarbonate, tarpaulin, acrylic-based resin, etc., from the viewpoint of adhesion, and other properties.

The specific method for printing and curing the photocurable inkjet printing ink composition of the present invention includes jetting the photocurable inkjet printing ink composition of the present invention with an inkjet head onto a base material and then exposing the coating film of the ink composition of the present invention that has landed on the base material to light to be cured.

For example, the jetting of the ink composition onto the base material (printing of images) is achieved by supplying the photocurable inkjet printing ink composition of the present invention to the printer head of an inkjet recording printer designed for a low-viscosity ink, and jetting the ink composition from the printer head onto the base material so that the thickness of the coating film is, for example, 1 to 60 μm. Also, exposure to light and curing (curing of the images) are achieved by irradiating with light the coating film of the photocurable inkjet printing ink composition of the present invention applied to the base material as images.

Any conventionally used inkjet recording printer may be used as the inkjet recording printer that prints the photocurable inkjet printing ink composition of the present invention. Note that, when a continuous inkjet recording printer is used, a conductivity-adding agent is further added to the photocurable inkjet printing ink composition of the present invention to adjust the conductivity.

Examples of the light source used in curing the coating film include ultraviolet ray (UV lamp), ultraviolet ray (light-emitting diode (LED)), electron beam, and visible light, but from an environmental perspective, a light-emitting diode (LED) that emits ultraviolet ray having an emission peak wavelength in the range of 350 to 420 nm is preferred.

The ultraviolet ray from a light-emitting diode (LED) light source is defined as "light emitted from a light-emitting diode that generates ultraviolet ray having an emission peak wavelength in the range of 350 to 420 nm".

EXAMPLES

The present invention is explained in greater detail below using examples; however, the present invention is not limited to these examples. It should be noted that, unless otherwise specified, "%" means "% by mass," while "part" means "part by mass."

The materials used in Examples and Comparative Examples below are listed below. All components other than solvents are expressed in solids content.

In the table, the unit of values in the rows concerning Pigments, Dispersants, Resins, Solvents, and Total is "% by mass", and the value Tg is a value possessed by an oligomer or a homopolymer of the monomer thereof (Amine-Modified Oligomer)

CN371 (manufactured by Sartomer)

(Photopolymerization Initiator)

TPO: 2,4,6-trimethylbenzoyl-diphenyl-phosphine oxide (manufactured by Lambson Group Ltd.)

(Sensitizer)

DETX: diethyl thioxanthone (manufactured by Lambson Group Ltd.)

(Polymerization Inhibitor)

UV-5: dioctyl maleate (manufactured by Kromachem Ltd.)

(Surface Conditioner)

BYK-315N: polyester-modified polymethyl alkyl siloxane surfactant, solid content 25% by mass, solvent component: a mixture of methoxy propyl acetate and phenoxyethanol with a mass ratio of 1:1 (manufactured by BYK-Chemie GmbH)

(Pigment)

PB 15:4, Pigment Blue 15:4

(Pigment Dispersant)

SOLSPERSE 32000 (manufactured by Lubrizol Corporation)

Examples 1 to 4 and Comparative Examples 1 to 5

<Production of Photocurable Inkjet Printing Ink Composition>

According to the formulations in Table 1 (formulation ratio of each material is based on % by mass), the respective materials were mixed under agitation to obtain the photocurable inkjet printing ink compositions in Examples and Comparative Examples.

<Evaluation Method and Evaluation Criteria>

The evaluation base materials listed in Table 1 are as follows.

PET: Lumirror, manufactured by Toray Industries, Inc.

PVC: PVC80, manufactured by LINTEC Corporation.

(Viscosity of Ink Composition)

The viscosities of the photocurable inkjet printing ink compositions obtained in Examples and Comparative Examples were measured using an E-type viscometer (product name: RE100L-type viscometer, manufactured by Toki Sangyo Co., Ltd.) under conditions including a temperature of 25° C. and a rotor speed of 20 rpm.

(Storage Stability)

The photocurable inkjet printing ink compositions obtained in Examples and Comparative Examples were collected in glass bottles and then sealed and stored at 70° C. After seven days, the compositions were evaluated according to the following evaluation criteria.

○: There was no thickening or sedimentation

X: There was thickening and sedimentation that will not be restored even after being shaken vigorously (Odor of Coating Film)

The photocurable inkjet printing ink compositions obtained in Examples and Comparative Examples were each applied to the surface of a PET film using a bar coater No. 6, and were irradiated with ultraviolet ray to obtain cured coating films.

The obtained coating films were cut into 8 cm×12 cm pieces, which were then put in 24 cm×34 cm zipper bags. After leaving them for an hour at 25° C., the zipper bags were opened, and the odor at the opening was evaluated on a five-point scale as follows.

5: No odor was sensed

4: Slight odor was sensed

3: Moderate odor was sensed

2: Strong odor was sensed

1: Extremely strong odor was sensed

Ten people conducted the same evaluation, and the arithmetic mean of the evaluation results was obtained.

(Curability)

The photocurable inkjet printing ink compositions obtained in Examples and Comparative Examples were each applied to the surface of a PET film using a bar coater No. 4 to obtain a coated matter. Subsequently, the compositions were evaluated based on the number of times (passed times) each composition was passed through the irradiator until surface tackiness was lost using a conveyor irradiator (STM-250E-16 manufactured by Heraeus Holding, lamp: Z-8 lamp (metal halide type)) under irradiation conditions of 120 W×50 m/min and an integrated UV intensity of 75 mJ/cm² [the integrated UV intensity was obtained by measuring the amount of irradiation in the measurement ranges of 250 to 260 nm, 280 to 320 nm, 320 to 390 nm, and 395 to 445 nm using UVIMAP (UM 365H-S) manufactured by EIT Inc. as a measuring instrument].

(Adhesion)

The photocurable inkjet printing ink compositions obtained in Examples and Comparative Examples were each applied to the surfaces of a variety of base materials (PET, PVC) using a bar coater No. 4, and were irradiated with ultraviolet ray to obtain cured coating films.

Adhesiveness of the obtained coating films was evaluated using Cellotape (registered trademark) according to the following evaluation criteria.

○: Not peeled

X: Peeled (Tackiness)

The photocurable inkjet printing ink compositions obtained in Examples and Comparative Examples were each applied to the surfaces of two PET films using a bar coater No. 4, and were irradiated with ultraviolet ray to obtain cured coating films.

The thus obtained cured coating films on the surfaces of the two PET films were put together face-to-face temporarily. After 30 seconds, the PET films were peeled from each other by hand, and the adhesion level was evaluated in accordance with the following evaluation criteria.

○: No tackiness was observed

X: Tackiness was observed (Abrasion Resistance)

The photocurable inkjet printing ink compositions obtained in Examples and Comparative Examples were each applied to the surface of a PVC film using a bar coater No. 6, and were irradiated with ultraviolet ray to obtain cured coating films.

The thus obtained coating films were evaluated in accordance with the following evaluation criteria regarding a state of the coating film being peeled and a state of the color being transferred to a white cloth when a white cloth was rubbed against the color-developed coating film 100 times using a Gakushin color fastness tester with a load of 500 g and at a speed of 60 rpm.

○: No color transfer or color transfer to less than 5% of the cloth area occurred Δ: Color transfer to 5% or more and less than 70% of the cloth area occurred X: Color transfer to 70% or more of the cloth area occurred (Water Resistance)

The photocurable inkjet printing ink compositions obtained in Examples and Comparative Examples were each applied to the surface of a PVC film using a bar coater No. 6, and were irradiated with ultraviolet ray to obtain cured coating films.

The thus obtained coating films were evaluated in accordance with the following evaluation criteria regarding a state of the coating film being peeled and a state of the color being transferred to a white cloth when a white cloth containing 5 drops of water was rubbed against the color-developed coating film 100 times using a Gakushin color fastness tester with a load of 500 g and at a speed of 30 rpm.

○: No color transfer, or color transfer to less than 5% of the cloth area occurred Δ: Color transfer to 5% or more and less than 70% of the cloth area occurred X: Color transfer to 70% or more of the cloth area occurred (Ethanol Resistance)

The photocurable inkjet printing ink compositions obtained in Examples and Comparative Examples were each applied to the surface of a PVC film using a bar coater No. 6, and were irradiated with ultraviolet ray to obtain cured coating films.

The thus obtained coating films were evaluated in accordance with the following evaluation criteria regarding a state of the coating film being peeled and a state of the color being transferred to a white cloth when a white cloth containing 5 drops of 70% ethanol solution was rubbed against the color-developed coating film 10 times using a Gakushin color fastness tester with a load of 200 g and at a speed of 30 rpm.

○: No color transfer, or color transfer to less than 30% of the cloth area occurred Δ: Color transfer of 30% or more and less than 70% of the cloth area occurred X: Color transfer of 70% or more of the cloth area occurred (Stretchability)

The photocurable inkjet printing ink compositions obtained in Examples and Comparative Examples were each applied to the surface of a PVC film using a bar coater No. 6 and were irradiated with ultraviolet ray to obtain cured coating films.

The obtained coating films were cut in the size of 2 cm×10 cm to prepare measurement sample pieces. Each measurement sample piece was stretched along a longitudinal axis using a tensile tester under a 25° C. environment at a tension speed of 50 mm/min. The length of each measurement sample piece that could be stretched without cracking the cured coating film was measured (X cm), and the stretch rate was calculated using the following formula, which was then evaluated in accordance with the following evaluation criteria.

$$\text{Stretch rate} = (X/10) \times 100 [\%]$$

○: Stretch rate was 140% or more

X: Stretch rate was less than 140%

(Bending Resistance)

The photocurable inkjet printing ink compositions obtained in Examples and Comparative Examples were each applied to the surface of a PVC film using a bar coater No. 12, and were irradiated with ultraviolet ray to obtain cured coating films.

The obtained coating films were bent at 180 degrees, and the states of the coating films were visually evaluated according to the following evaluation criteria.

○: No cracking of coating film

X: Cracking of coating film existed

TABLE 1

| | | Tg | Examples 1 | 2 | 3 | 4 | Comparative Examples 1 | 2 | 3 | 4 | 5 |
|---|---|---|---|---|---|---|---|---|---|---|---|
| Photo-polymerizable compound | CN371 | −39° C. | 3.00 | 3.00 | 3.00 | 3.00 | 3.00 | 3.00 | 3.00 | 3.00 | 3.00 |
| | VMOX | 120° C. | 30.00 | 15.00 | 40.00 | 42.80 | | 3.00 | 55.00 | 30.00 | 30.00 |
| | Vinylcaprolactam | 90° C. | | | | | 30.00 | | | | |
| | Hexanediol diacrylate | 43° C. | 20.00 | 25.00 | 20.00 | 25.00 | 20.00 | 20.00 | 20.00 | | 45.00 |
| | Benzyl acrylate | 6° C. | 6.12 | 21.12 | 6.12 | 6.12 | 6.12 | 6.12 | 6.12 | 6.12 | 6.12 |
| | Lauryl acrylate | −26° C. | 27.80 | 22.80 | | | | 27.80 | 27.80 | 2.80 | 27.80 | 2.80 |
| | Ethyl carbitol acrylate | −67° C. | | | 17.80 | 10.00 | | 27.00 | | 20.00 | |
| Photopolymerization initiator | TPO | | 8.00 | 8.00 | 8.00 | 8.00 | 8.00 | 8.00 | 8.00 | 8.00 | 8.00 |
| Sensitizer | DETX | | 0.50 | 0.50 | 0.50 | 0.50 | 0.50 | 0.50 | 0.50 | 0.50 | 0.50 |
| Polymerization inhibitor | UV-5 | | 2.00 | 2.00 | 2.00 | 2.00 | 2.00 | 2.00 | 2.00 | 2.00 | 2.00 |
| Surface conditioner | BYK-315N | | 0.50 | 0.50 | 0.50 | 0.50 | 0.50 | 0.50 | 0.50 | 0.50 | 0.50 |
| Pigment | PB15:4 | | 1.60 | 1.60 | 1.60 | 1.60 | 1.60 | 1.60 | 1.60 | 1.60 | 1.60 |
| Pigment dispersant | SOLSPERSE 32000 | | 0.48 | 0.48 | 0.48 | 0.48 | 0.48 | 0.48 | 0.48 | 0.48 | 0.48 |
| Total | | | 100.00 | 100.00 | 100.00 | 100.00 | 100.00 | 100.00 | 100.00 | 100.00 | 100.00 |
| Viscosity (mPa · s) | | | 7.3 | 7.3 | 6.9 | 7.5 | 8.0 | 6.3 | 7.6 | 6.2 | 8.5 |
| Storage stability | | | ○ | ○ | ○ | ○ | X | ○ | ○ | ○ | ○ |
| Coating film odor | | | 5 | 5 | 5 | 5 | 2 | 4 | 2 | 3 | 5 |
| Curability | | | 1 | 1 | 1 | 1 | 1 | 2 | 8 | 10< | 1 |
| Adhesion (PET) | | | ○ | ○ | ○ | ○ | ○ | ○ | ○ | ○ | ○ |
| Adhesion (PVC) | | | ○ | ○ | ○ | ○ | ○ | ○ | ○ | ○ | ○ |
| Tackiness | | | ○ | ○ | ○ | ○ | X | X | ○ | X | ○ |
| Abrasion resistance | | | ○ | ○ | ○ | ○ | ○ | X | ○ | X | ○ |
| Water resistance | | | ○ | ○ | ○ | ○ | Δ | Δ | ○ | Δ | ○ |
| Ethanol resistance | | | ○ | ○ | ○ | ○ | Δ | ○ | ○ | X | ○ |
| Stretchability | | | ○ | ○ | ○ | ○ | ○ | ○ | X | ○ | X |
| Bending resistance | | | ○ | ○ | ○ | ○ | ○ | ○ | X | ○ | X |

Examples 1, 3, and 4 according to the present invention had excellent storage stability and no odor of cured coating film, and had beneficial effects of curability, adhesion to a variety of base materials, tackiness, abrasion resistance, water resistance, ethanol resistance, stretchability, and bending resistance.

Example 2 in which the amount of VMOX was slightly low manifested good results including that the coating film had no tackiness.

Comparative Example 1, in which vinylcaprolactam was employed instead of VMOX, exhibited poor storage stability, a strong odor of the cured coating film, strong tackiness, and slightly poor water resistance and ethanol resistance.

Comparative Example 2, including a small content of VMOX and excessive monofunctional monomer having a glass-transition temperature of 10° C. or less, exhibited slight odor of the coating film especially after being cured, tackiness, and poor abrasion resistance. In contrast, Comparative Example 3, including an excessive content of VMOX and an insufficient content of monofunctional monomer having a glass-transition temperature of 10° C. or less, exhibited a strong odor of the coating film and poor curability, stretchability, and bending resistance.

Comparative Example 4, containing excessive monofunctional monomer having a glass-transition temperature of 10° C. or less, exhibited odor of the coating film, poor curability, tackiness of the cured coating film, poor abrasion resistance, and poor ethanol resistance. Comparative Example 5, including an insufficient content of monofunctional monomer having a glass-transition temperature of 10° C. or less, exhibited poor stretchability and bending resistance.

What is claimed is:

1. A photocurable inkjet printing ink composition comprising:
vinyl methyl oxazolidinone by 5 to 50% by mass relative to the entire ink composition; and
a monofunctional photopolymerizable monomer having a glass-transition temperature of 10° C. or less, by 10 to 50% by mass relative to the entire ink composition; and further,
amine-modified oligomer;
a colorant; and
a photopolymerization initiator,
said photocurable inkjet printing ink composition comprising no isobornyl acrylate.

2. The photocurable inkjet printing ink composition according to claim 1, wherein the colorant comprises a color pigment other than a white pigment.

3. The photocurable inkjet printing ink composition according to claim 1, wherein a content of the amine-modified oligomer is 0.5 to 20.0 mass % in the photocurable inkjet printing ink composition.

* * * * *